No. 103,029.  
J. A. DRAKE.  
EARTH CLOSET.  
PATENTED MAY 17. 1870.
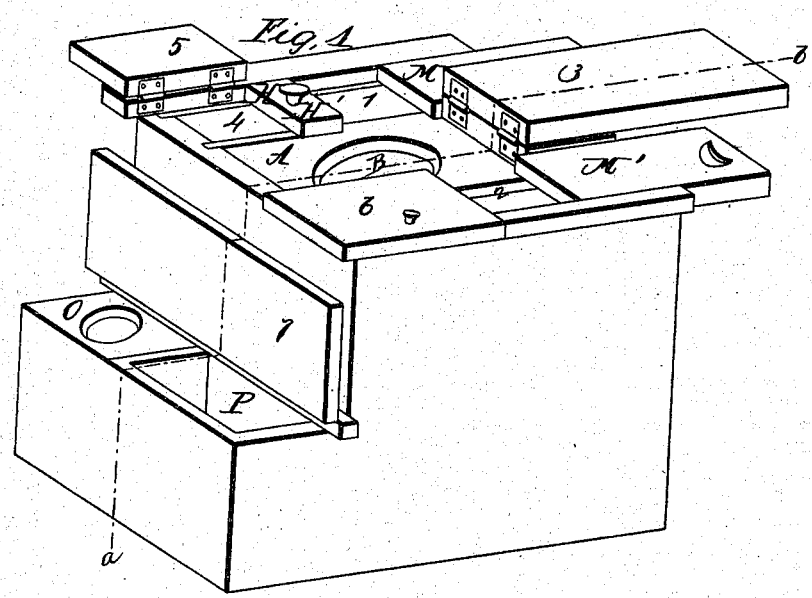
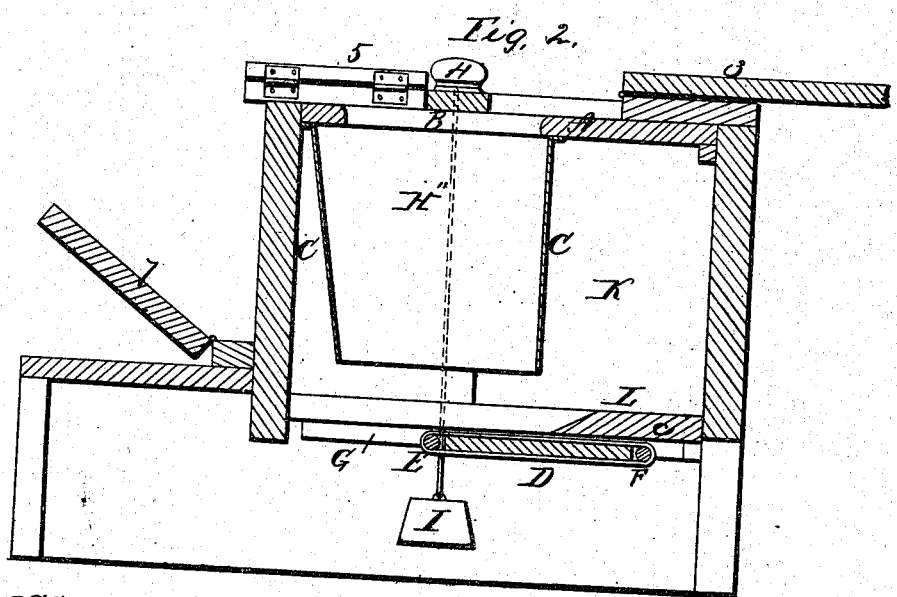
Witnesses:  
H. N. Jenkins  
Rufus R. Rhodes
Inventor,  
James Addison Drake

United States Patent Office.

JAMES ADDISON DRAKE, OF NEW ORLEANS, LOUISIANA, ASSIGNOR TO WILLIAM R. C. CLARK, OF SAME PLACE.

Letters Patent No. 103,029, dated May 17, 1870.

IMPROVEMENT IN EARTH-CLOSETS.

The Schedule referred to in these Letters Patent and making part of the same

I, JAMES ADDISON DRAKE, of the city of New Orleans and State of Louisiana, have invented a certain Improvement in Earth-Closets or Commodes, which I denominate a "Family Closet," of which the following is a specification.

My invention relates to a method of depositing dry earth or other equivalent deodorizing-substance, in regulated and sufficient quantity, with each deposit of excrement, the two being mingled together by means of an endless apron, so arranged as to be moved by each occupant of the closet, by simply pulling a cord within reach of the seat, precisely far enough to precipitate the deposit of excrement with enough dry earth to deodorize it, and also so as never to move except in the right direction to effect such precipitation, my object being to provide a simple and cheap mechanical arrangement for applying dry earth or its equivalent to the purpose of deodorizing human excrement, and thus to destroy the baleful effects of the gases which exhale therefrom when not so treated, and to adapt it at once to fertilizing purposes.

My improvement will be instantly understood on a reference to the drawing, whereon—

Figure 1 is a perspective view of a family closet in which it has been introduced, and Figure 2, a sectional view of the same closet on line $a\,b$ of fig. 1.

On the drawing—

A is the seat, in which a properly-formed opening, B, is provided, in the ordinary manner.

Below this opening, for some distance down, a metallic shield, C, is secured, substantially as shown at fig. 2.

The object of this shield is to secure the fall of the excreta within circumscribed limits, or on an endless apron, D, on which the deodorizing agent constantly rests about two inches thick.

This apron is mounted on rollers E F, which have their journals in metallic strips G, that are secured in any proper manner to the frame of the closet.

The rollers E F are so placed that the apron D, in its front half section, comes under the line of the descent of the excreta from those who occupy the seat, so as to secure the fall of the same on the apron with unfailing certainty.

The apron D is moved by means of a cord, H'', preferably of wire rope, galvanized, which, fastened to a knob, H, that is sustained on the frame at H', extends down through a small hole to roller E, around which it is wrapped one turn, and then below this roller to a weight, I.

The length of the cord H'' should be so adjusted that the space between the weight I and the roller E will be sufficient to move the apron just far enough to precipitate or dump the excreta, as well as the proper quantity of dry earth along with it, for it will be observed that, by pulling up the cord by means of the knob H, the roller E, in consequence of the encircling grasp of said cord around it, will be rotated in that direction which will carry the apron forward sufficiently to effect that object whenever the length of the cord below roller E is properly adjusted. The weight I will carry back the cord to its normal position the moment the operator lets go the knob H, without rotating the roller E, or moving the apron, because, there being no tension on the cord above the said roller, there can be no effect produced by the movement of the cord in a downward direction. But, as an additional preventive against a backward movement of the apron D, I may employ a catch, $c$, in the nature of a pawl, (see fig. 2,) which is so constructed and adjusted that, while interposing no resistance to the movement of said apron in the right direction, it will effectually check or prevent any backward movement thereof by a positive impingement or biting of its front edge against the apron over roller F, the said pawl being provided with a series of short teeth, or in any other manner adapted to accomplish this object.

Above the apron D, and of any proper form, a hopper-like recipient for a sufficient supply of dry earth is placed, as shown at K, fig. 2.

The bottom of the hopper may consist of a floor, L, placed just above the apron, in which an aperture over the latter is made, as shown; or the sides of the hopper may converge toward each other from the top downwardly, so as to leave an opening at the bottom slightly less than that portion of the apron on which the dry earth falls.

The sides of the hopper, the shield being the front side, subserve the purpose of holding the earth on the apron, and of preventing too much of the same from being precipitated at any one operation.

The earth is put into the hopper through openings that are covered by the lids M M', as shown at 1 2, fig. 1.

A hinged cover for the seat is provided, as shown at 3.

A box receptacle for paper, &c., is placed on the right of the seat, as shown at 4, having a cover, 5, while an opening for urinating purposes is placed on the left-hand side, and provided with a cover, 6.

A terrace or step-like projection at the front of the closet provides a footing for adults when using the closet, by means of a lid, 7, and, at the same time, a convenient seat for young children, as shown at O, and a box, P, for dry earth, which may be put on the excrement by the nurse, by hand, or by means of a small properly-formed implement.

Instead of having the apron as shown, I may attach upon the outer surface thereof a series of thin metal platforms, so arranged that each one of them will project a few inches beyond or in front of the roller E, as the apron moves forward, before inclining downwardly, and thus precipitate a sufficient quantity of the earth with the feces on it, at each operation, a corresponding distance in advance of said roller. In this case, if any be found necessary, a different device from the catch or pawl c must be employed to prevent the apron from moving backward, and the apron may be placed a little back of the position it occupies on the drawings.

My family closet, or, as it may more properly be called, commode, is easily portable, and hence may be carried to any part of the house, at pleasure. It is simple, cheap, and not liable to get out of order.

I claim as my invention—

The apron D, in connection with a cord, H'', provided with a knob, H, and a weight, I, in combination with a pawl, c, when these parts are constructed, arranged, and operate as herein described, for the purpose set forth.

JAMES ADDISON DRAKE.

Witnesses:
H. N. JENKINS,
RUFUS R. RHODES.